United States Patent [19]

Appl et al.

[11] Patent Number: 4,676,961

[45] Date of Patent: Jun. 30, 1987

[54] STABILIZED WATER-CONTAINING SODIUM DITHIONITE FORMULATIONS WHICH HAVE BEEN RENDERED ALKALINE

[75] Inventors: Max Appl, Dannstadt-Schauernheim; Wilhelm Goesele, Wachenheim; Jaroslav Melzer; Siegfried Schreiner, both of Ludwigshafen; Gert Treiber, Worms, all of Fed. Rep. of Germany

[73] Assignee: BASF Aktiengesellschaft, Ludwigshafen, Fed. Rep. of Germany

[21] Appl. No.: 704,100

[22] Filed: Feb. 22, 1985

[51] Int. Cl.$^4$ .................... C09K 3/00; C01B 17/66
[52] U.S. Cl. ................... 423/265; 423/515; 252/188.22; 252/188.23; 252/188.24
[58] Field of Search ............... 423/265, 515; 252/188.22, 188.23, 188.24

[56] References Cited

U.S. PATENT DOCUMENTS

| | | | |
|---|---|---|---|
| 1,810,663 | 6/1931 | Kritchevky et al. | 252/188.23 |
| 2,995,522 | 8/1961 | Joyce | 252/188.22 X |
| 3,054,658 | 9/1962 | Franklin et al. | 252/188.23 X |
| 3,207,694 | 9/1965 | Gogek | 252/188.23 X |
| 3,287,276 | 11/1966 | Poschmann et al. | 252/105 |
| 3,353,909 | 11/1967 | Janson et al. | 423/265 |
| 3,669,895 | 6/1972 | Shastri | 252/188.22 X |
| 3,714,340 | 1/1973 | Fujiwara et al. | 423/515 |
| 3,718,732 | 2/1973 | Winslow, Jr. et al. | 423/515 X |
| 3,773,679 | 11/1973 | Kise et al. | 252/188.22 X |
| 3,804,944 | 4/1974 | Kise et al. | 252/188.22 X |
| 3,839,217 | 10/1974 | Owen et al. | 252/188.22 X |
| 3,839,218 | 10/1974 | Owen et al. | 423/515 X |
| 3,856,696 | 12/1974 | Stanbank et al. | 423/265 X |
| 3,887,695 | 6/1975 | Plentovich et al. | 423/515 |
| 3,985,674 | 10/1976 | Ellis et al. | 252/188.22 X |
| 4,082,683 | 4/1978 | Galesloot | 252/188.23 X |
| 4,100,098 | 7/1978 | Magan | 252/188.22 X |
| 4,126,716 | 11/1978 | Yamamoto et al. | 423/265 X |
| 4,127,642 | 11/1978 | Bostian | 423/515 |
| 4,283,303 | 8/1981 | Ellis | 252/188.22 X |
| 4,534,954 | 8/1985 | Little et al. | 423/265 X |
| 4,614,647 | 9/1986 | Appl et al. | 252/188.22 X |

FOREIGN PATENT DOCUMENTS

| | | | |
|---|---|---|---|
| 3337388 | 4/1985 | Fed. Rep. of Germany | 252/188.22 |
| 695375 | 7/1950 | United Kingdom | 423/515 |

OTHER PUBLICATIONS

Derwent Abstract No. 61104R-E, (Sep. 1970), "Stabilised Composition of Sodium Hydrosulphite".

*Primary Examiner*—John F. Terapane
*Assistant Examiner*—Matthew A. Thexton
*Attorney, Agent, or Firm*—Keil & Weinkauf

[57] ABSTRACT

Stabilized water-containing sodium dithionite formulations which have been rendered alkaline have the consistency of a pumpable paste. They additionally contain readily soluble sodium salts and/or potassium salts which are inert to sodium dithionite and whose water-solubility at 20° C. exceeds 500 g/l. These salts are present in the aqueous phase in an amount of not less than 200 g/l. The pastes are useful reducing agents.

4 Claims, No Drawings

STABILIZED WATER-CONTAINING SODIUM DITHIONITE FORMULATIONS WHICH HAVE BEEN RENDERED ALKALINE

The present invention relates to water-containing sodium dithionite formulations which do not tend to ignite spontaneously and furthermore are easy to handle and meter when used as reducing agents or bleaches, for example in the bleaching of groundwood.

Sodium dithionite, frequently also referred to as sodium hydrosulfite, is classified as a spontaneously ignitable hazardous material under the regulations governing transportation. It is used in large amounts in the chemical industry, for example for bleaching groundwood in the papermaking industry, and as a reducing agent in the dyeing process in the textile industry.

Although anhydrous sodium dithionite is substantially stable when stored in closed containers, it decomposes very rapidly in the presence of water or moisture. The presence of even a small amount of water, e.g. from 3 to 10% by weight, causes the product to warm up and decompose, as a result of hydration. During this decomposition, sulfur is liberated with further heat generation; at above 210° C., the sulfur reacts with the atmospheric oxygen present in the crystalline mass and burns with the production of flames. In a fire of this type, substantial amounts of sulfur dioxide are evolved, which causes the transport containers to burst and hence permits further atmospheric oxygen to enter.

To reduce these risks, the more stable compound zinc dithionite has therefore frequently been used; however, for reasons relating to environmental protection, the use of this product is constantly declining.

It is known that the tendency of sodium dithionite to decompose and to undergo spontaneous ignition can be reduced by diluting it with inert substances. A large variety of substances have been disclosed as diluents, eg. alkaline salts, such as sodium carbonate, sodium phosphate or sodium polyphosphates, urea or dry powders of readily soluble synthetic polymers (DE-B No. 1,220,399 and DE-B No. 1,226,992).

Furthermore, US-C 1,810,663 describes formulations containing sodium dithionite in which the latter is coated with an essentially water-insoluble substance. Substances of this type which are mentioned are oils, fats and waxes. Moreover, the coating contains an emulsifier whose purpose is to emulsify the coating substance on dissolution in water.

The coating compositions mentioned in GB-C No. 695,375 are liquid esters of low volatility which are derived from alcohols of more than 5 carbon atoms. These esters should be used only in amounts such that there is no substantial adverse effect on the free-flowing properties of the dithionite.

Apart from the fact that these powder products are difficult to handle, none of the commercially available stabilized solid sodium dithionite formulations completely satisfies the safety requirements of the processing industry. Because the fine and coarse components present in the products have different flow properties, the metering of these products is adversely affected. Furthermore, the fine components make it more difficult to process these products, giving rise to troublesome dust which has to be suppressed by means of further additives or eliminated by additional apparatuses. As a result of both of these factors, powder formulations of this type are more difficult to process.

For these reasons, the method increasingly adopted over the past few years for the production of sodium dithionite has been one in which the user himself prepares aqueous solutions of sodium dithionite by reaction of sodium borohydride, sodium hydroxide solution and sulfur dioxide. However, this method has the disadvantage that the user has to carry out an involved additional step to produce a starting material.

Some of the above disadvantages of the sodium dithionite powder formulations can be overcome by using aqueous sodium dithionite solutions. However, they have the disadvantage that they are only stable for a limited period, ie. about 4 weeks from the time of preparation of the solution, this stability being achieved, however, only if the solution is cooled to below 10° C., kept in the absence of air and rendered alkaline. Moreover, the transportation costs, which are higher than in the case of the powder, play an increasingly significant role as the distance increases. For this reason, such solutions can only be used where the distance between manufacturer and user is relatively short.

Sodium dithionite formulations which contain organic liquids in an amount such that they have the consistency of a pumpable paste have also been proposed. Compared with the solid sodium dithionite formulations, these pastes have the advantage that they are more stable to the action of water and atmospheric oxygen than are the powder mixtures conventionally used previously, and, becaqse they are easier to transport and to meter, can be more advantageously processed than these mixtures.

We have found that, in sodium dithionite formulations, organic liquids can be partially or completely dispensed with and water employed as the liquid phase.

The present invention accordingly relates to water-containing sodium dithionite formulations which have been rendered alkaline, wherein the formulations have the consistency of a pumpable paste and furthermore contain sodium salts and/or potassium salts which are inert to sodium dithionite and readily soluble in the aqueous phase and have a water-solubility greater than 500 g/l at 20° C., with the provison that the concentration of the salt dissolved in the aqueous phase is not less than 200 g/l.

The viscosities of the novel pastes are from 0.1 to 1,500, preferably from 0.5 to 100, Pa.s (determined in a Couette rheometer at 20° C. and at a shear rate of 10 s$^{-1}$; cf. Praktische Rheologie der Kunststoffschmelzen und -Lösungen, M.H. Pahl VDI-Verlag, Buch Nr. ISBN 3-18-404097-6). When water-containing sodium dithionite pastes having this viscosity are used, they can be readily transported and metered using pumps or metering apparatuses for the manipulation of pasty substances.

According to the invention, the water-containing sodium dithionite pastes contain, in addition to water, sodium salts and/or potassium salts which are inert to sodium dithionite and are readily soluble in the aqueous phase, ie. salts which have a water-solubility of not less than 500 g/l. Examples of such salts are sodium formate, sodium acetate, sodium hydroxymethanesulfinate, potassium carbonate and potassium sulfite. Particularly preferred salts are sodium formate and sodium hydroxymethanesulfinate, which is known under the trade name Rongalit.

The novel sodium dithionite formulations accordingly contain not only sodium dithionite and water but also the stated salts and, in small amounts of about 1%, sodium hydroxide solution or potassium hydroxide solution to render the entire formulation alkaline, the pH advantageously being >10.

The amount of dithionite in the novel pastes can vary from 60 to 70% by weight, and that of the water from 15 to 30% by weight, the total content of these two components in the formulation not exceeding 90% by weight. The remainder (to 100%) comprises the soluble salts, the stated hydroxides and, if required, conventional stabilizers for sodium dithionite, eg. sodium ethylenediaminetetraacetate.

Some of the water present in the formulation according to the invention can be replaced by a water-miscible organic liquid, in particular an alcohol, such as methanol, ethanol, glycol or glycerol.

The amount of salts present in the aqueous phase should be no less than 200 g/l; in the case of aqueous phases which do not contain any organic liquid, the amount of salts is advantageously not less than 300 g/l. The upper limit of the content is determined by the saturation concentration of the particular salt. Salts present in the novel formulation in amounts over and above this saturation value, ie. in undissolved form, do not of course have an adverse effect on the formulations but on the other hand are not desirable.

In the novel formulations, it is essential that the readily soluble salts used have a water-solubility of not less than 500 g/l, although the actual concentration in the aqueous phase need not reach this value but, as stated above, may even be substantially lower. For example, it is possible to use sodium chloride, which has a water-solubility of about 360 g/l at 20° C., since its solubility exceeds the required minimum solubilities of 200 or 300 g/l. Surprisingly, however, such a paste to which sodium chloride has been added exhibits virtually no improvement in stability in comparison to a salt-free paste. We have found that, when the very highly soluble salts are used, the sodium dithionite is present in the form of anhydrous crystals in the novel formulations, whereas in the case of more sparingly water-soluble salts, eg. NaCl, the dithionite is present as the dihydrate, which is evidently substantially less stable.

In the preparation of the formulations according to the invention, the salt is first dissolved in the required amount of water, the sodium dithionite is incorporated into the solution obtained, the paste is rendered alkaline and, if required, further stabilizers and dispersants are then added.

After storage for a certain time, or as a result of shaking during transportation, the novel pastes may exhibit partial separation, which manifests itself in the separation of a small amount of the liquid component. However, the thin layer of liquid floating on the paste can once again be mechanically incorporated into the paste without difficulty.

To prevent this separation effect, it is, however, simpler to add a small amount, eg. not more than about 2% by weight, of a dispersant or thickener to the paste.

In the presence of small amounts of water, which in powder products result in rapid decomposition and spontaneous ignition, no reaction takes place. Dangerous decomposition phenomena associated with the sodium dithionite present in the paste were not observed even on heating to, for example, 80° C.

The advantageous processing properties of the pastes owing to the fact that they are easy to transport and to meter have been pointed out above.

The novel pastes are useful reducing agents and can be employed wherever powder formulations containing sodium hydrosulfite powder are used, for example in the bleaching of groundwood, and as a reducing agent, eg. in vat dyeing.

EXAMPLES

The salts identified in the Table below, in the indicated amounts, are dissolved in each case in the stated amount of water or a water/alcohol mixture. In each case, 0.1% by weight of sodium ethylenediaminetetraacetate is added to the solution, which is then brought to pH 13 by adding NaOH. The amount of sodium dithionite stated in the Table in each case is then incorporated into the solution under nitrogen.

TABLE

| No. | Liquid component | Salt | Amount (g) Liquid phase | Amount (g) Salt | Hydrosulfite 88% g | Viscosity of the paste (Pa.s) | $Na_2S_2O_4$ content after 3 weeks as a % of the starting value |
|---|---|---|---|---|---|---|---|
| 1 | $H_2O$ | — | 200 | — | 730 | about 2 | 65 |
| 2 | " | NaCl | 206 | 94 | 680 | about 3 | 68 |
| 3 | " | NaCOOH | 162 | 138 | 663 | about 1.5 | 98 |
| 4 | " | " | 162 | 94 | 680 | about 2 | 95 |
| 5 | " | $CH_3COONa$ | 150 | 150 | 660 | about 4 | 94 |
| 6 | " | $CH_2OH.SO_2Na$ | 150 | 150 | 660 | about 4 | 92 |
| 7 | " | $K_2SO_3$ | 160 | 150 | 720 | about 100 | 92 |
| 8 | $H_2O/CH_3OH = 4/1$ | NaCOOH | 180 | 120 | 740 | about 500 | 98 |
| 9 | " | $CH_2OH-SO_2Na$ | 180 | 120 | 680 | about 10 | 95 |
| 10 | $H_2O/C_2H_5OH = 4/1$ | NaCOOH | 180 | 120 | 680 | about 10 | 98 |
| 11 | $H_2O/CH_2OH.CH_2OH = 4/1$ | " | 180 | 120 | 660 | about 2 | 98 |
| 12 | $H_2O$ | $NaCOOH/Na_2CO_3 = 1/1$ | 160 | 60 / 60 | 660 | about 2 | 92 |

The Table shows that the formulations according to the invention (Experiments 3 to 12) have a substantially longer shelf life. In the most unfavorable case, 92% of the dithionite initially present in the formulation is still retained after storage for 3 weeks at 20° C. These values can of course be further improved by storage at lower temperatures. For comparison, a formulation which contains only water or additionally contains the fairly sparingly soluble sodium chloride is listed under Experiments 1 and 2. In the two cases, the sodium dithionite content has dropped to 65% and 68%, respectively, which shows that, for example, sodium chloride has no effect.

We claim:

1. A stabilized water-containing sodium dithionite formulation having a ph >10 and containing 60 to 70% by weight of sodium dithionite and 15 to 30% by weight of water, the total content of these two components in the formulation not exceeding 90% by weight, and furthermore containing a sodium and/or potassium salt which is dissolved in said water, is inert to sodium dithionite and has a water solubility greater than 500 g/l at 20° C., said salt being a member selected from the group consisting of sodium formate, sodium acetate, sodium hydroxymethanesulfinate, potassium carbonate and potassium sulfite and mixtures thereof, with the provison that the concentration of said sodium and/or potassium salt dissolved in the water is not less than 200 g/l.

2. A sodium dithionite formulation as defined in claim 1, which has a viscosity of from 0.1 to 1,500 Pa.s.

3. A sodium dithionite formulation as definied in claim 1, wherein the concentration of the readily soluble salt in the aqueous phase is not less than 300 g/l.

4. A sodium dithionite formulation as defined in claim 1, wherein the aqueous phase contains a water-miscible alcohol.

* * * * *

UNITED STATES PATENT AND TRADEMARK OFFICE
CERTIFICATE OF CORRECTION

PATENT NO. : 4,676,961

DATED : June 30, 1987

INVENTOR(S) : Max APPL et al.

It is certified that error appears in the above-identified patent and that said Letters Patent is hereby corrected as shown below:

On the Title Page Add:

[30] Foreign Application Priority Data

February 22, 1984 [DE] Fed. Rep of Germany ... 34 06 322.6

Column 5, line 7, "provision" should read -- proviso --.

Signed and Sealed this

Fifteenth Day of December, 1987

Attest:

DONALD J. QUIGG

Attesting Officer

Commissioner of Patents and Trademarks